July 17, 1962 R. K. POTTLE 3,044,423
MACHINE FOR MANUFACTURING FIBROUS CONTAINER BODIES
Filed April 14, 1960 13 Sheets-Sheet 1

Fig. 1

INVENTOR.
RALPH KENNICOTT POTTLE
BY George P. Ziehmer Jr.
AGENT

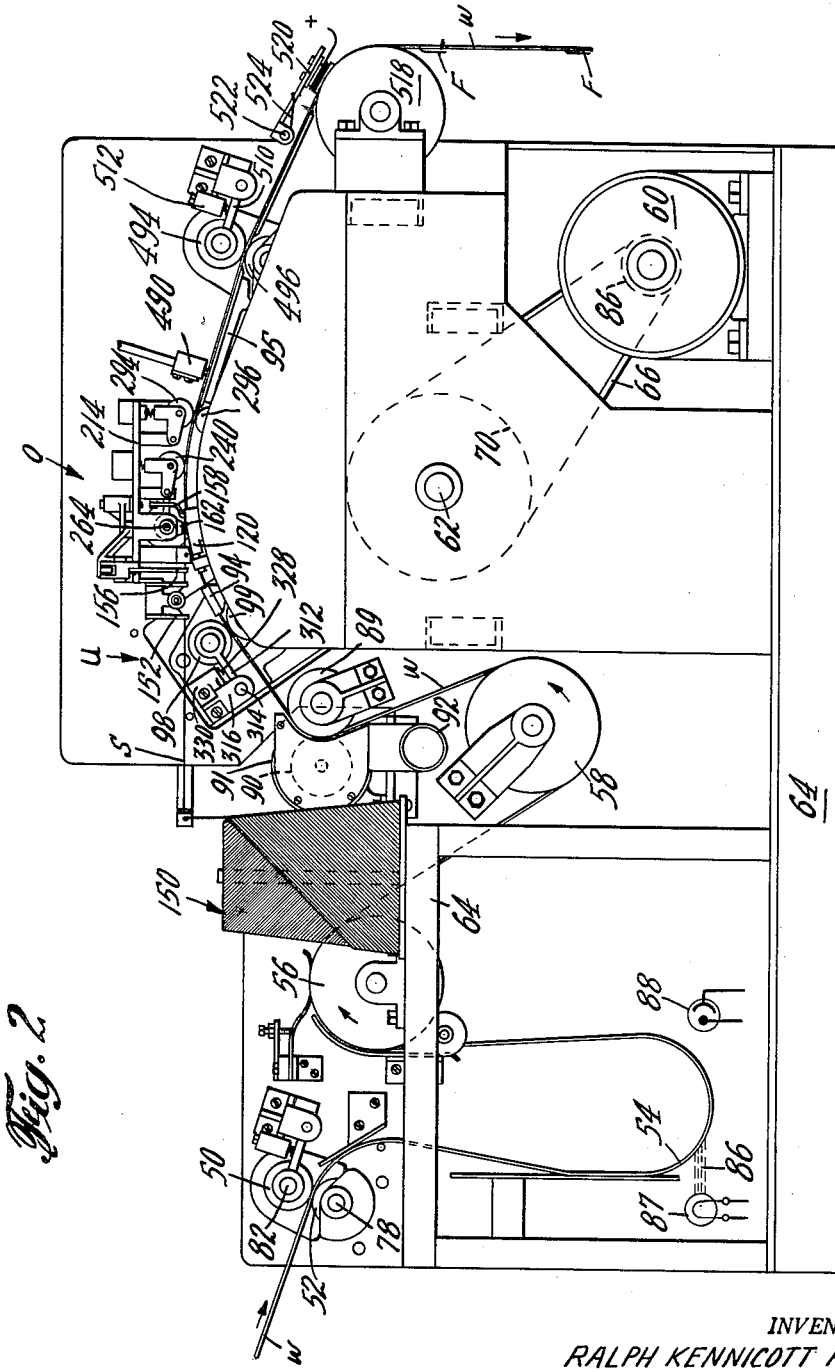

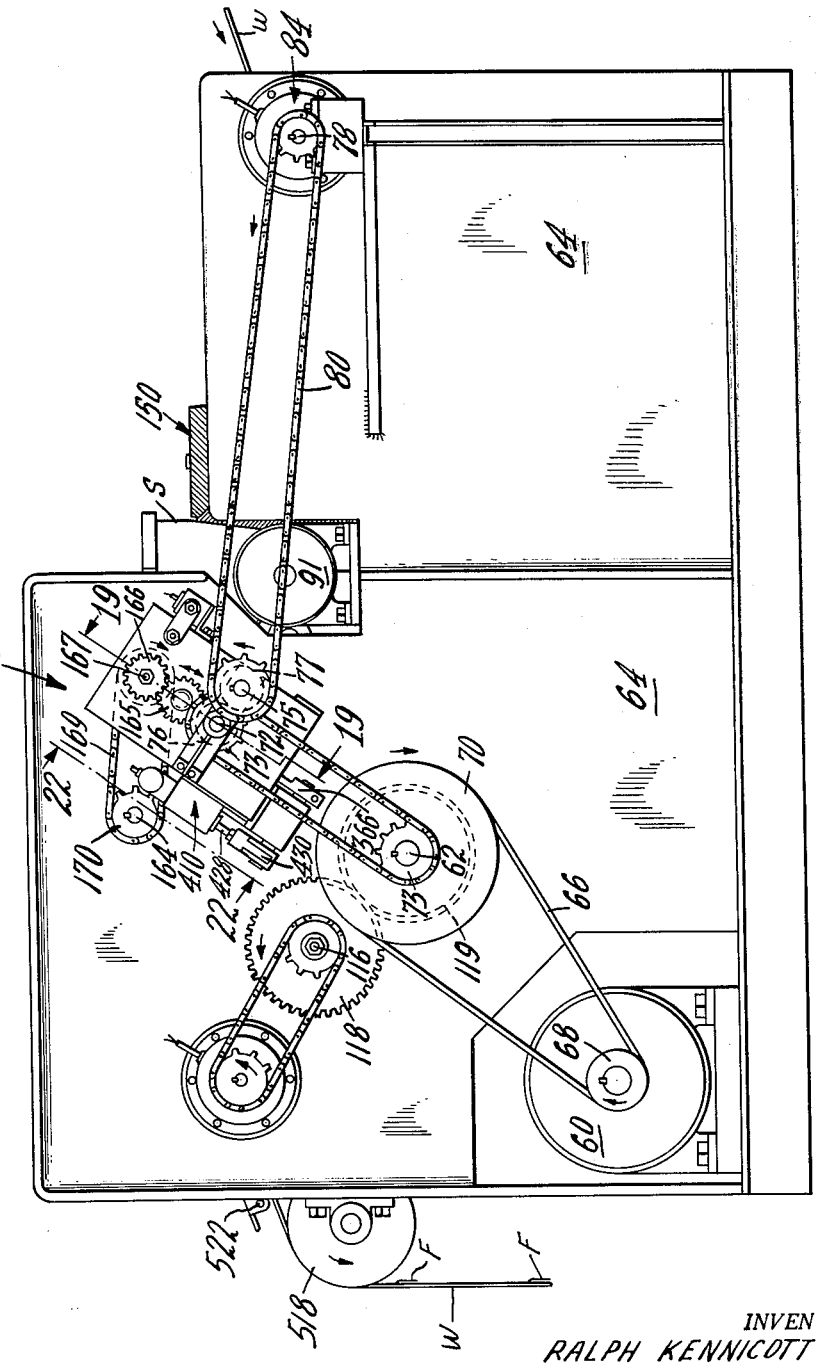

July 17, 1962 R. K. POTTLE 3,044,423
MACHINE FOR MANUFACTURING FIBROUS CONTAINER BODIES
Filed April 14, 1960 13 Sheets-Sheet 4
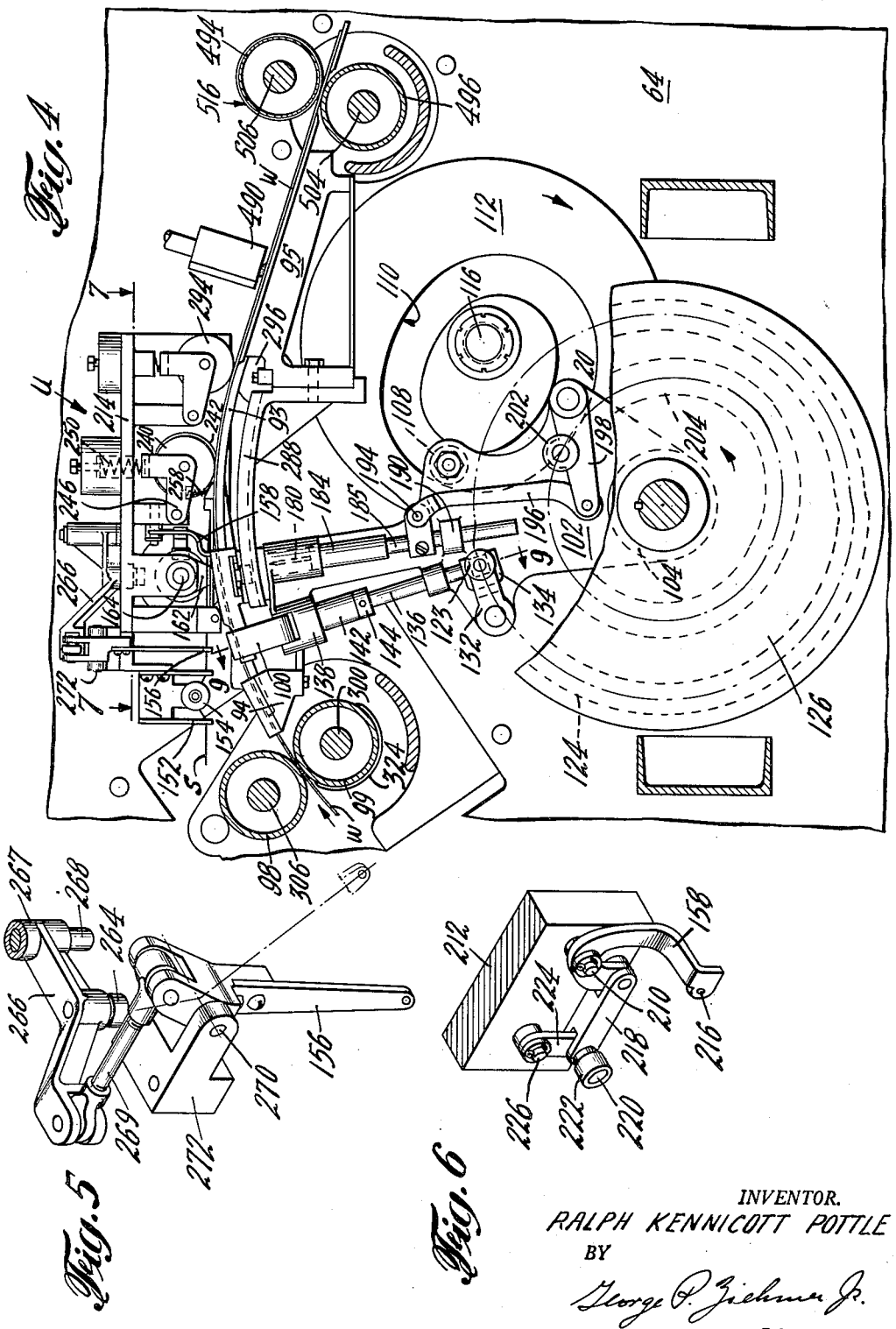
INVENTOR.
RALPH KENNICOTT POTTLE
BY
George P. Ziehmer Jr.
AGENT July 17, 1962 R. K. POTTLE 3,044,423
MACHINE FOR MANUFACTURING FIBROUS CONTAINER BODIES
Filed April 14, 1960 13 Sheets-Sheet 5
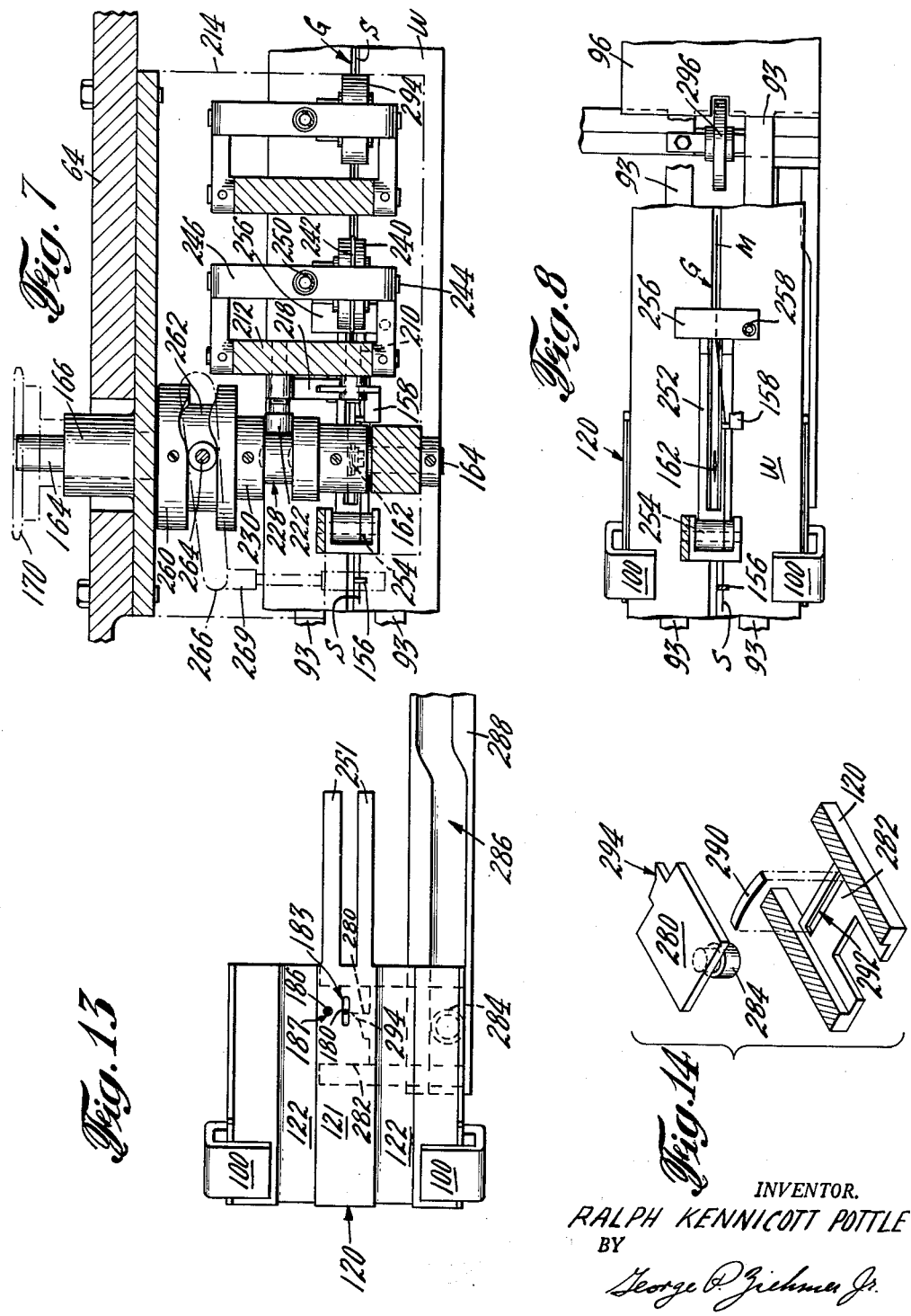
INVENTOR.
RALPH KENNICOTT POTTLE
BY
George P. Ziehmer Jr.
AGENT

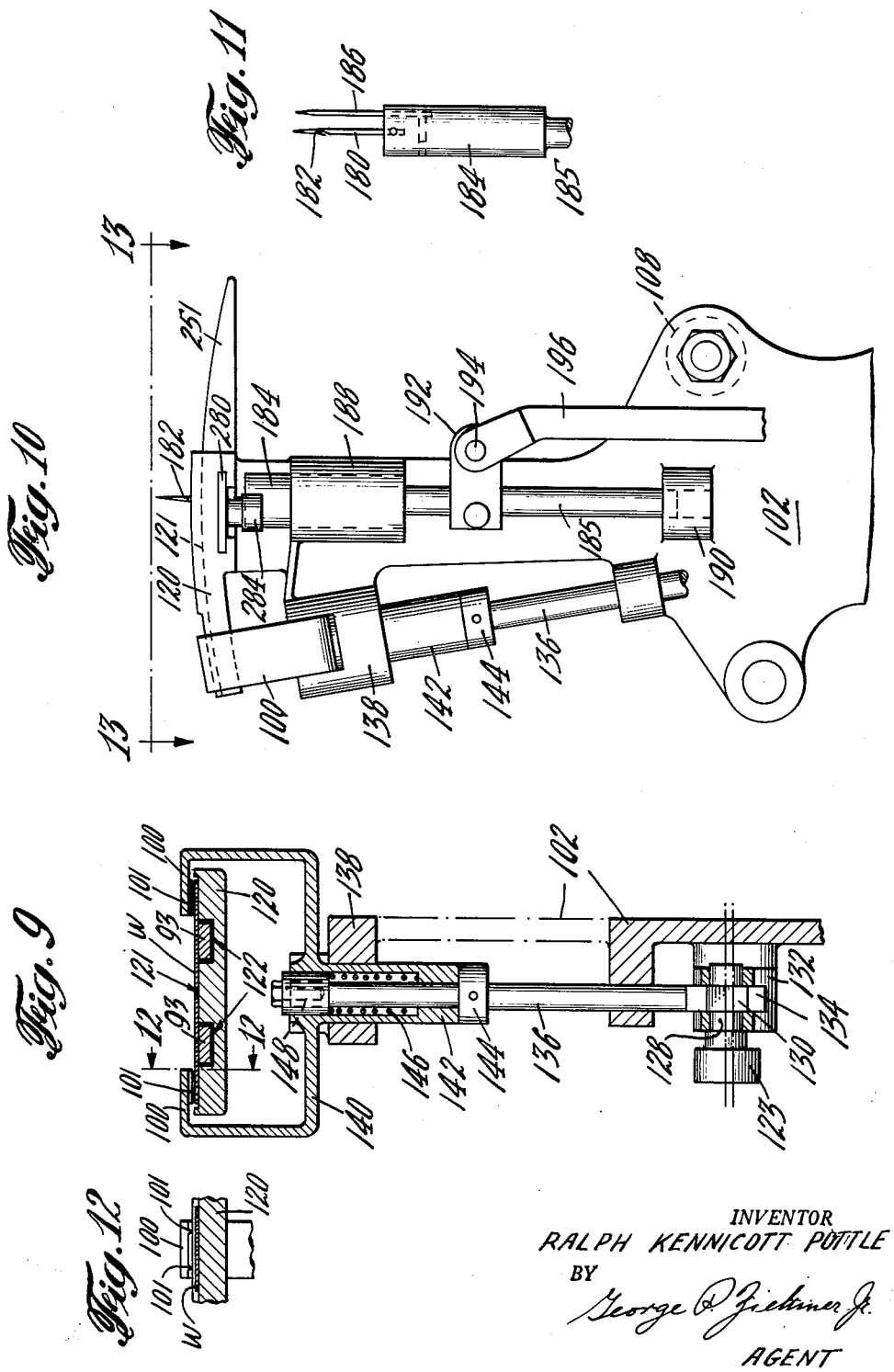

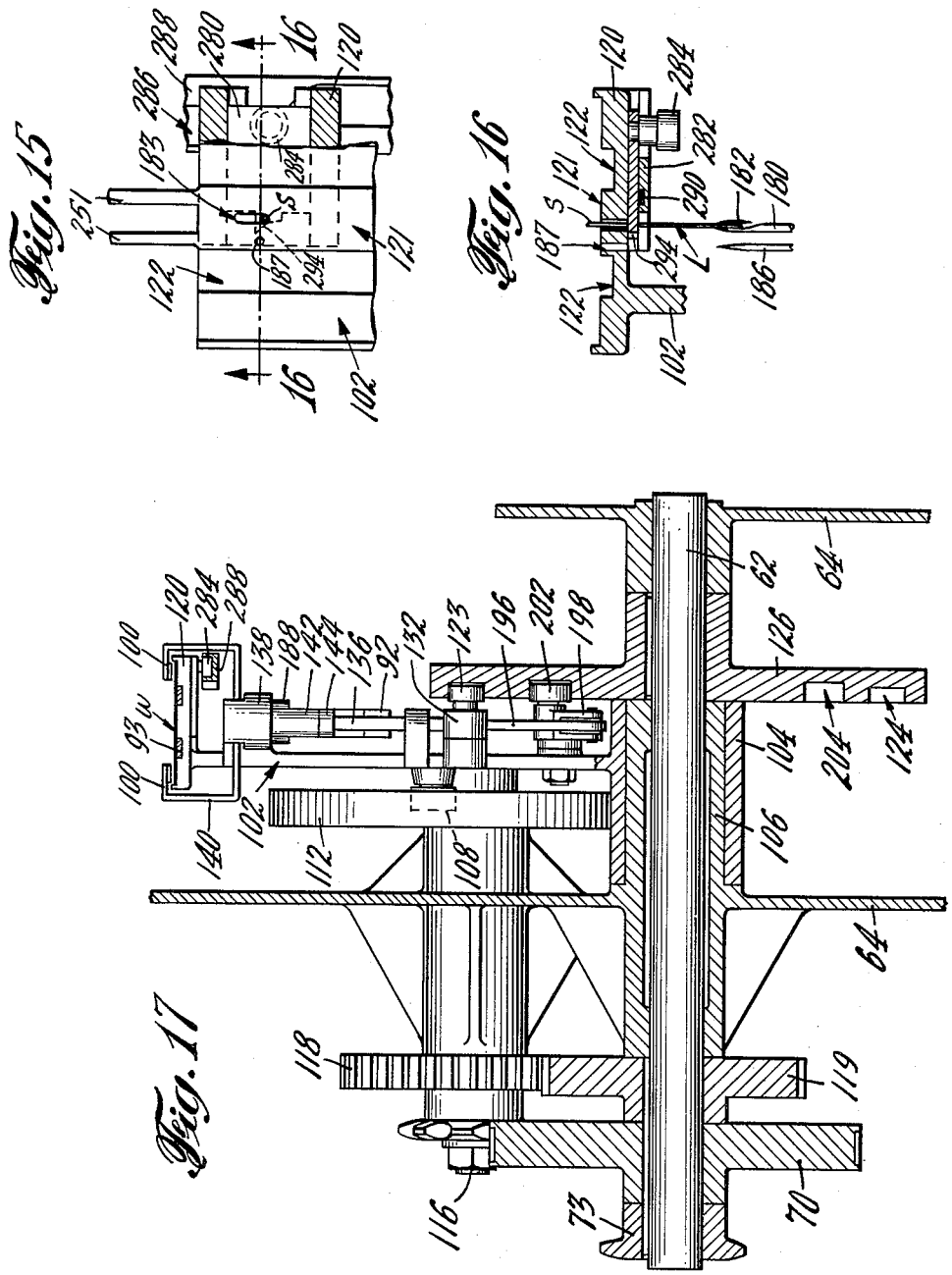

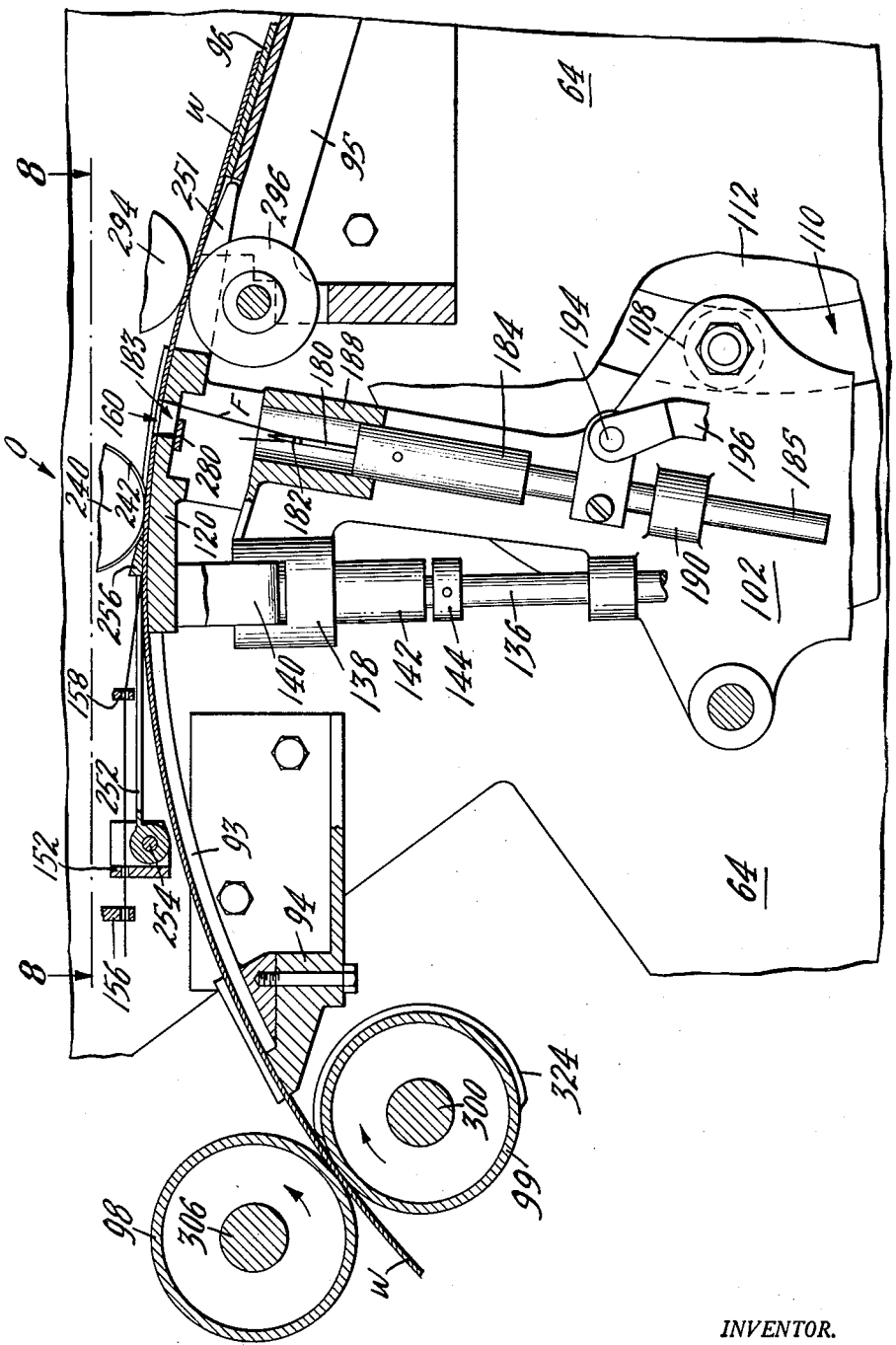

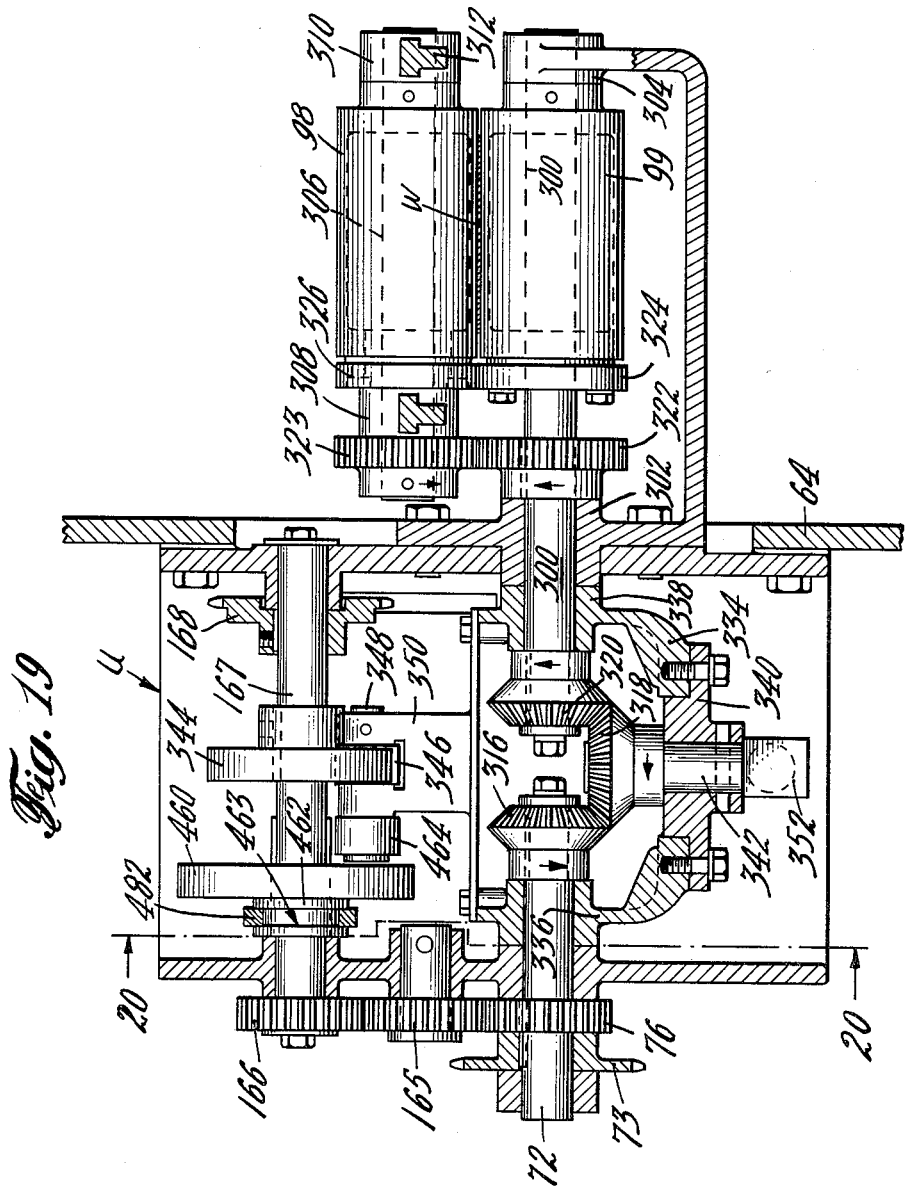

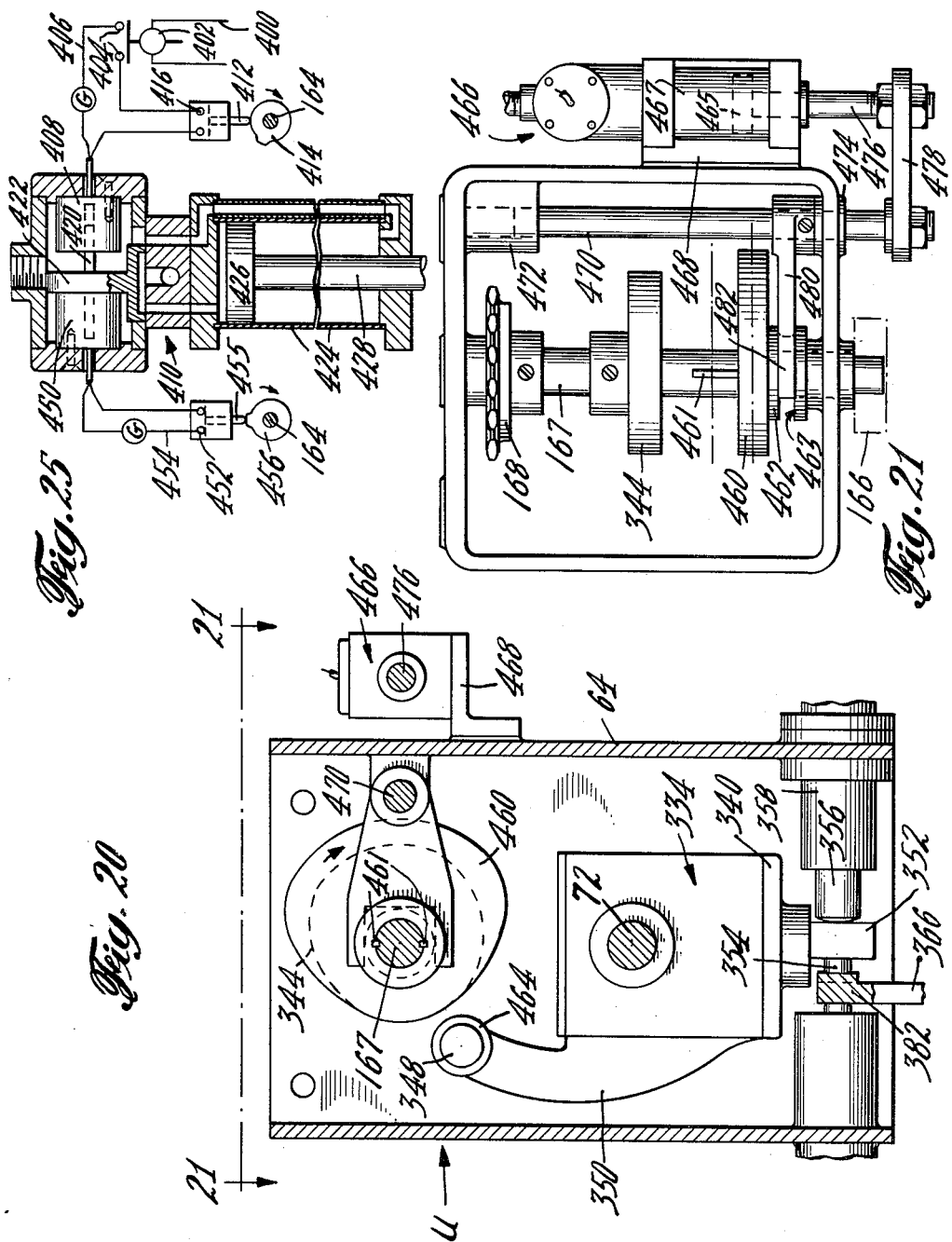

July 17, 1962 R. K. POTTLE 3,044,423
MACHINE FOR MANUFACTURING FIBROUS CONTAINER BODIES
Filed April 14, 1960 13 Sheets-Sheet 11
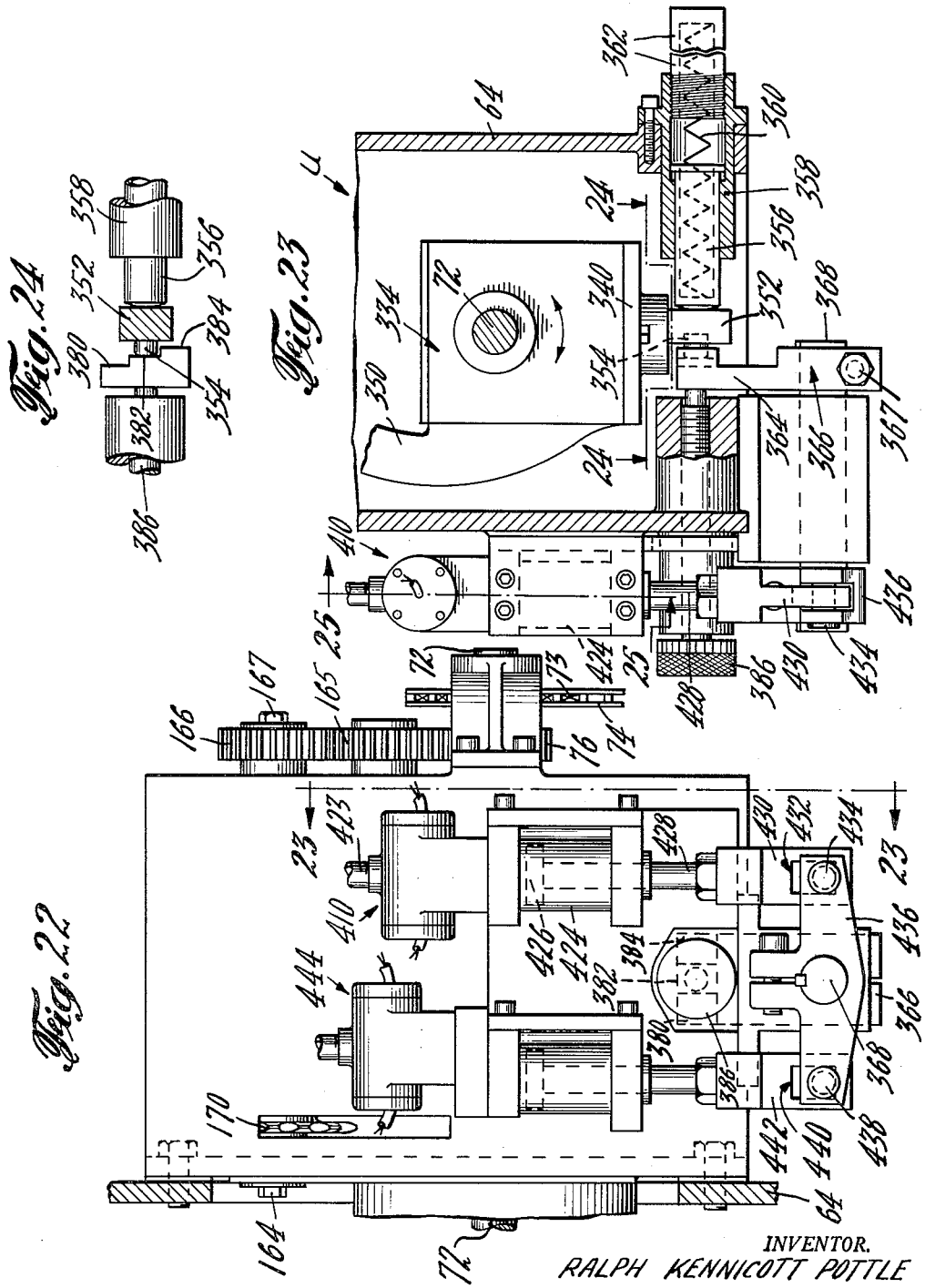
INVENTOR.
RALPH KENNICOTT POTTLE
BY
George P. Ziehmer Jr.
AGENT

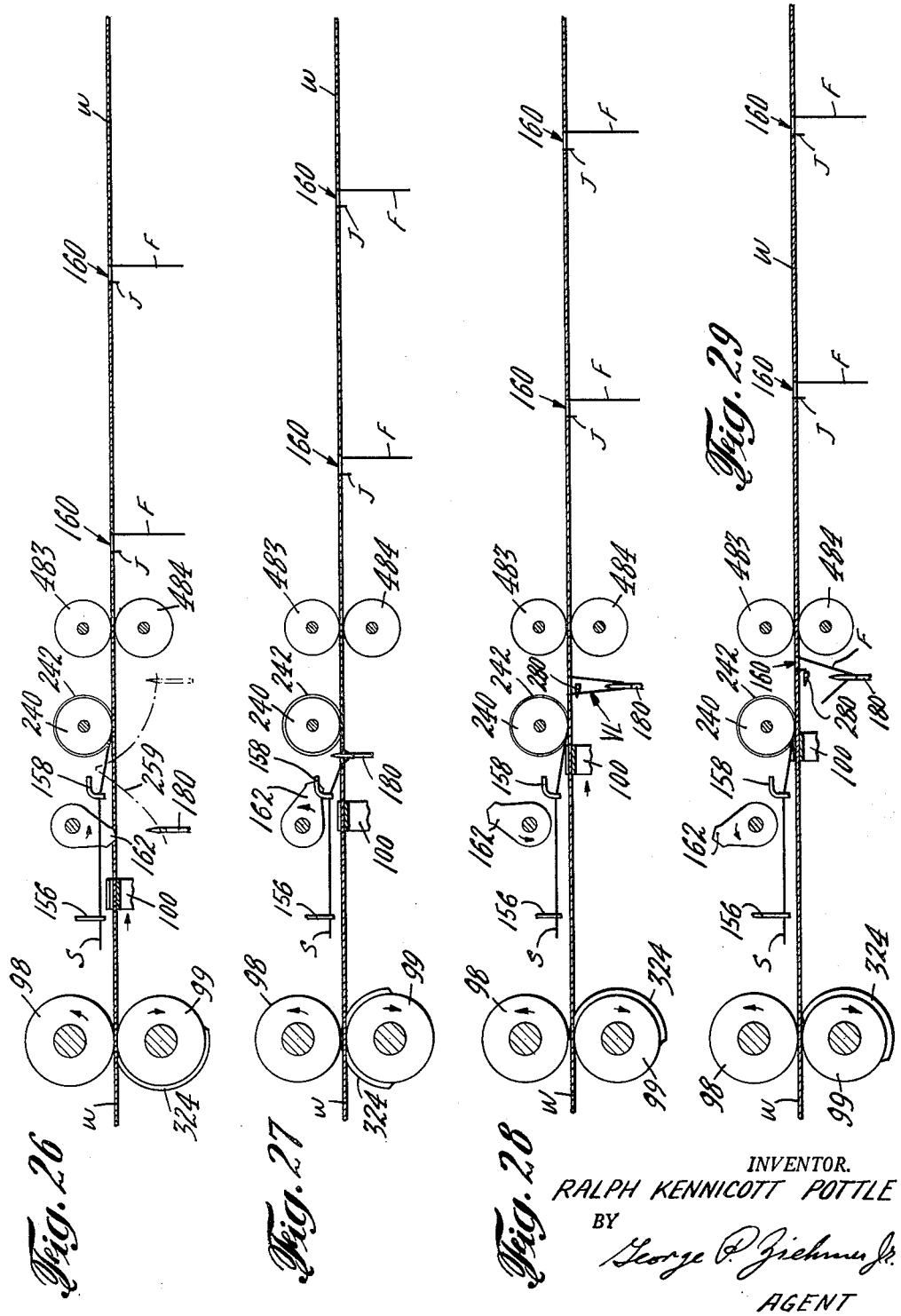

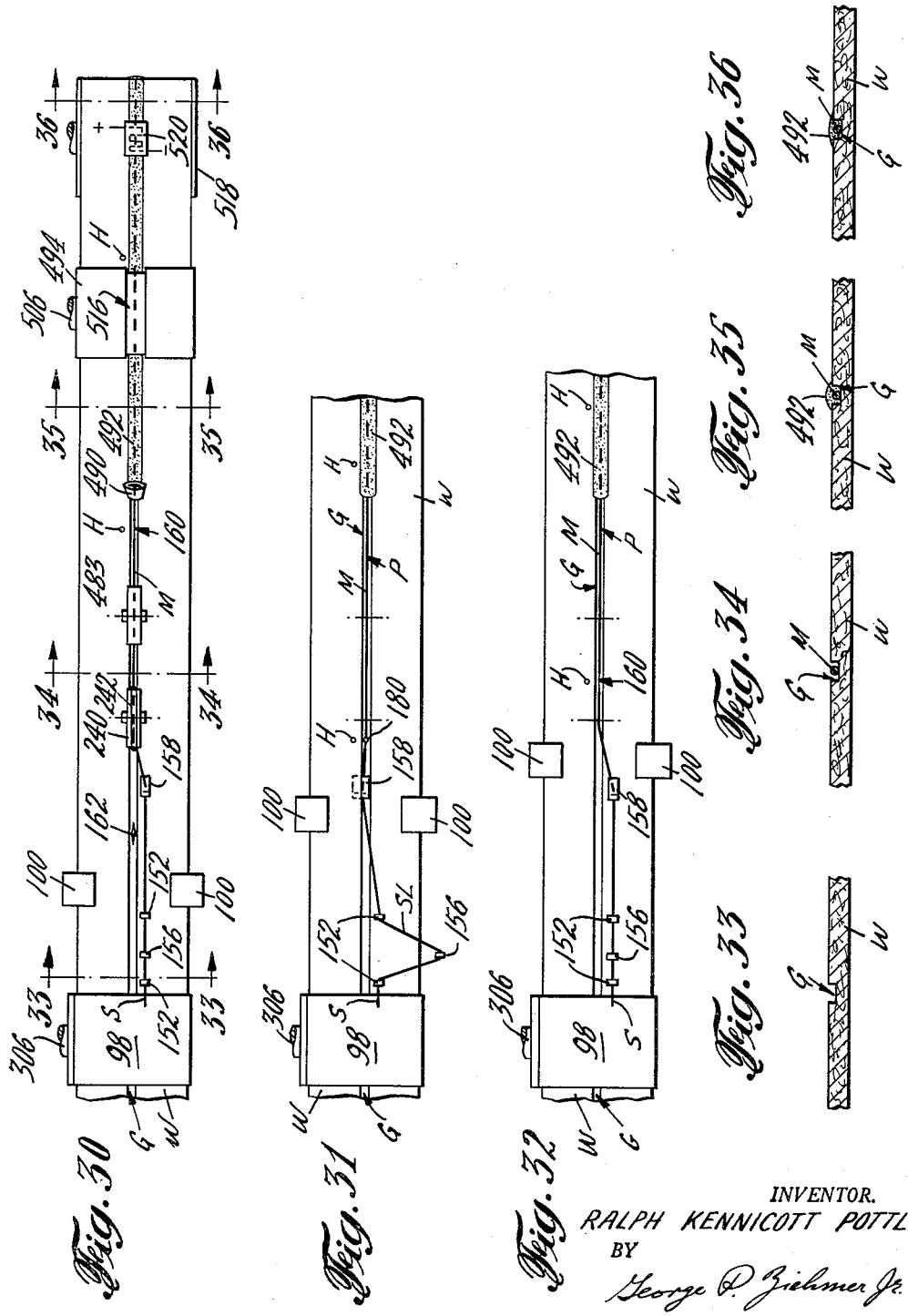

United States Patent Office 3,044,423
Patented July 17, 1962

3,044,423
MACHINE FOR MANUFACTURING FIBROUS CONTAINER BODIES
Ralph Kennicott Pottle, Georgetown, Conn., assignor to American Can Company, New York, N.Y., a corporation of New Jersey
Filed Apr. 14, 1960, Ser. No. 22,182
20 Claims. (Cl. 112—2)

The present invention relates to a machine for manufacturing fibrous container bodies and has particular reference to a machine for inserting pull strings in a web of body stock prior to its introduction into a spiral winder which incorporates it in a helically wound tube from which individual can bodies are subsequently cut.

A newly developed container which has recently been introduced on the market comprises a spirally wound, multi-ply, labelled fibrous body which is closed at both ends by crimped-on metal end closures. In order to permit this container to be opened without the use of tools, it is provided with a pull string which is carried on the inside of one of the body plies and extends helically around the body for a major portion of its length. Adjacent one end of the container, this pull string passes through an opening in the body ply and terminates in a free end which passes between the label overlap and projects from the outside of the container body in such manner it may be easily grasped by the consumer and pulled to cause the pull string to tear through at least the label and one of the body plies to so weaken the body that it can thereafter be easily opened completely by a twisting pressure manually applied to the ends of the body. This container is disclosed in copending United States application Serial No. 729,666 which was filed on April 18, 1958, now Patent No. 3,022,472, in the names of Ralph K. Pottle and William B. Elam and was assigned to the instant assignee.

In the manufacture of the fibrous bodies for such containers, the several plies of body stock and a preprinted label ply are fed in web form to a spiral winding machine which wraps them around a cylindrical mandrel to form them into an endless tube which is subsequently cut into the individual bodies by an automatic cutting unit which is mounted adjacent the end of the mandrel.

In order to position the pull strings between the plies in such bodies, they are preferably secured in place in one of the body webs prior to the time the web is incorporated into the endless tube. A machine and method for performing this operation are disclosed in my copending United States application Serial No. 19,872, which was filed in the United States Patent Office on April 4, 1960, and is entitled "Machine and Method for Manufacturing Fibrous Container Bodies."

In the machine disclosed in that prior patent application, the body web is fed intermittently through the machine, there being a dwell between each advancement of the web. During each such dwell, a portion of an endless supply string is pulled through the web by a hooked needle to form a loop on the underside. This loop is then cut through to separate an individual pull string from the supply string, the string from the cut loop forming a free end which is integral with the major portion of the pull string, which portion is disposed on the opposite surface of the web. The length of the major portion of each such individual pull string which is thus severed from the supply string is determined by the distance the web is advanced between successive loop forming and cutting operations.

Such machine is quite practical and has been operated quite successfully. However, as is true of almost all machines wherein the material operated upon is intermittently advanced, its operating speed is definitely limited.

The present invention comprises an improvement over such machine by providing a machine wherein the web is advanced continuously while the individual pull strings are formed in it.

In the instant machine, the web is advanced continuously through the main operating station of the machine by two independently operating feed mechanisms. One of these mechanims is a clamping device which is carried by an oscillating arm which carries the hooked needle which pulls the supply string through the web to form the loops. This clamping device is operative only during the forward stroke of the oscillating arm. Since the hooked needle also operates to form the loops during the forward strokes of the oscillating segment, there is no relative movement between the web and the needle during the loop forming operations.

On the back stroke of the oscillating arm, the clamps are released and the feeding of the web is taken over by a pair of feed rolls which are rotated in time with the oscillating arm. These feed rolls are cammed apart during the forward stroke of the oscillating arm, but are brought together on the return stoke of the arm to take over the feeding of the web.

It frequently is necessary to vary the spacing between the loops in order to bring the individual pull strings into registration with the preprinted labels in the finished tubes, and to maintain them in registration with the labels. The reason for this is fully described in my copending application Serial No. 19,872, filed April 4, 1960.

In order to effect this variation, which is in effect a correction of the position of the pull strings in the web, a surge unit is incorporated in the drive mechanism which drives the feed rolls and which is hooked up with the mechanism which drives the oscillating arm so that the feed rolls and the oscillating arm are actuated in a one to one ratio.

The surge unit is set so that it accelerates the feed rolls during each of their feeding strokes to thus add an increment to the length of web which would be normally fed by them on each such stroke. However, controls are provided so that the increment can be either increased or decreased, depending on the necessity for increasing or decreasing the spacing between successive loops in the web.

Since the cam separated feed rolls must be kept in time with the oscillating arm in order to have the web under control at all times, it is of course necessary to offset or compensate for such increments. In the machine of the instant invention this compensation takes the form of an offsetting deceleration of the feed rolls which is effected after the feed rolls have been cammed apart and the feeding of the web has been taken over by the clamps of the oscillating arm. Consequently, the deceleration of the feed rolls which is necessary to keep them in timed relationship to the oscillating arm is made without effecting a corresponding deceleration of the web, and thus without interference with the loop forming needle carried by the oscillating arm.

As a result of this construction, the present invention provides a smoothly operating machine of simple design which can be operated at relatively high speeds.

An object of the invention, therefore, is the provision of a machine for forming and attaching individual pull strings to a continuously moving web at high operating speeds.

Still another object is the provision of such a machine wherein two independently operating feed mechanisms are utilized to feed the web through the main operating station of the machine.

Another object of the invention is the provision of such a machine wherein means are incorporated for automatically effecting corrections of the positions of the individual pull strings in the web while the machine is in operation.

Yet another object of the invention is the provision of such a machine wherein the necessary corrections are made by only one of such feed mechanisms while it has control over the web, and at such times that the corrections will not interfere with the functioning of the parts which actually effect the formation of the individual pull strings.

Numerous other objects and advantages of the invention will be apparent as it is better understood from the following description, which, taken in connection with the accompanying drawings, discloses a preferred embodiment thereof.

Referring to the drawings:

FIGURE 1 is a plan view of a machine made according to the principles of the instant invention;

FIG. 2 is a front elevation of the machine of FIG. 1;

FIG. 3 is a rear elevation of the machine of FIG. 1;

FIG. 4 is an enlarged front elevation of a portion of the machine shown in FIG. 2, the view showing the oscillating arm in position at the beginning of its forward, operating stroke;

FIG. 5 is a perspective view on an enlarged scale of the slack loop forming arm and its associated operating linkages;

FIG. 6 is a perspective view on an enlarged scale of the threader arm and its associated operating linkages;

FIG. 7 is a horizontal sectional detail on an enlarged scale taken substantially along the line 7—7 of FIG. 4;

FIG. 8 is a horizontal sectional detail taken substantially along the line 8—8 in FIG. 18, parts being broken away and other parts being omitted for the sake of clarity of illustration;

FIG. 9 is an enlarged sectional detail of the web clamping mechanism taken substantially along the line 9—9 of FIG. 4;

FIG. 10 is a side elevation of the portion of the oscillating arm which carries the mechanism of FIG. 9;

FIG. 11 is an elevation of the needle holder which is also carried by the oscillating arm shown in FIG. 10;

FIG. 12 is a sectional detail taken substantially along the line 12—12 of FIG. 9;

FIG. 13 is a plan view of the upper portion of the oscillating arm of FIG. 10 looking substantially along the line 13—13 of that figure, this view also showing the cam segment which actuates the cutoff knife carried by the oscillating arm;

FIG. 14 is a perspective view of the cutoff knife which is carried by the oscillating arm of FIG. 10;

FIG. 15 is a plan view of a portion of the oscillating arm shown in FIG. 13, parts being broken back to illustrate the cutoff knife after it has been moved through its cutting stroke;

FIG. 16 is a sectional detail taken substantially along the line 16—16 of FIG. 15;

FIG. 17 is an enlarged vertical section taken substantially along the line 17—17 of FIG. 1;

FIG. 18 is an enlarged elevational section of a portion of the mechanism shown in FIG. 4, the view showing the oscillating segment at the completion of its forward stroke after the stitch loop has been formed and cut;

FIG. 19 is a sectional detail on an enlarged scale taken substantially along the line 19—19 of FIG. 3, showing the surge unit which imparts an increment to the feed stroke of the main feed rollers;

FIG. 20 is a vertical section taken substantially along the line 20—20 of FIG. 19;

FIG. 21 is a plan view looking substantially along the line 21—21 of FIG. 20;

FIG. 22 is an elevation taken substantially along the line 22—22 of FIG. 3;

FIG. 23 is a sectional view taken substantially along the line 23—23 of FIG. 22;

FIG. 24 is a sectional detail taken substantially along the line 24—24 of FIG. 23;

FIG. 25 is a sectional detail taken substantially along the line 25—25 of FIG. 23;

FIGS. 26–29 are schematic elevational views illustrating the sequence of formation of an individual pull string in the web W;

FIGS. 30–32 are schematic plan views illustrating the sequence of formation of an individual pull string in the web W; and FIGS. 33–36 are enlarged vertical sectional details taken substantially along the lines 33—33, 34—34, 35—35, 36—36, respectively, of FIG. 30.

As a preferred and exemplary embodiment of the instant invention, the drawings illustrate a machine wherein individual pull strings P, each of which is formed with an integral free end F, are continuously formed and secured in longitudinal alignment in an endless web W which comprises a suitable fibrous material. After leaving the machine, the web W is fed directly to a spiral winder (not shown) which winds it, together with other webs, into a continuous tube which is thereafter divided at uniform intervals to form individual container bodies, each of which is provided with one of the pull strings P properly located therein.

In the instant machine, the endless web W is obtained from a suitable source of supply such as a supply roll (not shown) and is initially fed into the machine by a pair of constantly rotating feed-in rolls 50, 52. After passing through the feed-in rolls 50, 52 the web W is formed into a slack loop 54 and then passed around a pair of idler drums 56, 58.

All of the main operating parts of the machine are driven from a main drive motor 60 (see FIG. 1) which is mounted on the main machine frame 64. Power from the motor 60 is transmitted to a main drive shaft 62 by means of a drive belt 66 which operates around a small motor pulley 68 and a large pulley 70 which is secured to the main drive shaft 62. The rotation of the drive shaft 62 is transmitted to a small cross-shaft 72 by a chain 74 (see FIG. 3) which operates around sprockets 73 secured to each of these shafts, and the rotation of the shaft 72 is in turn transmitted to a shaft 75 by means of a pair of meshing spur gears 76, 77. In turn, rotation of the shaft 75 is transmitted to a shaft 78 by a chain 80. The shaft 78 carries on it the lower feed-in roll 52, and it in turn is geared to the shaft 81 of the upper feed-in roll 50 so that these feed-in rolls are operated at the same surface speed to feed the web W into the machine, the upper roll 50 being mounted in a pivoted yoke 82 and being pressed downwardly towards the lower roll 52 by a spring 83.

An electromagnetic clutch 84 (see FIG. 3) is interposed in the shaft 78 so that the feed-in rolls 50, 52 can be disconnected from the main drive of the machine. The feed-in rolls 50, 52 are, as a result of their gearing, normally driven at a speed slightly in excess of the speed at which the web W is fed through the remainder of the machine. As a result, the slack loop 54, as long as the electromagnetic clutch 84 is energized, is constantly being enlarged in size. When it reaches its maximum desired size, the slack loop 54 intercepts a beam of light 86 which is emitted by a light source 87 which is suitably mounted adjacent the bottom of the machine. The beam 86 is focused horizontally into a photoelectrical cell 88. When the beam of light is thus cut off by the slack loop, the output of the photoelectric cell 88 is varied and this variation is utilized by suitable electric circuits (not shown) to deenergize the electromagnet clutch 84 and thus disconnect the feed-in roll 50, 52 from the main drive. As a result, the rolls 50, 52 coast and gradually slow down, thereby reducing the feed-in speed of the web W so that the size of the slack loop 54 is diminished. The electromagnetic clutch 84 is deenergized for a suitable length of time by a time delay relay (not shown) so that the slack loop 54 does not become too small. Thereafter, the clutch 84 reengages, and the slack loop 54 increases in size until it again intercepts the light beam 86, at which time the just described cycle of operation is again repeated.

After passing around the idler drum 58, the web W passes around a small idler roll 89. As the web W passes around the roll 89, a small toothed milling wheel 90 (see FIGS. 1 and 2) which is driven at high speed by an electric motor 91 and mounted in opposition to the roll 89, cuts a shallow longitudinal groove G (see FIG. 32) in the web W. The loose fibers produced by the cutting action of the milling wheel 90 are preferably removed from the machine by a suitable vacuum manifold 92. After the groove G has thus been formed in the web W, the web W enters the main operating station O of the machine where the individual pull strings P are formed and secured to it. At this main station O, the web W is supported by a guide track which comprises a pair of laterally spaced, arcuate rails 93 (see FIGS. 4, 9 and 18), which at one end are secured in a bracket 94 which is bolted to the machine frame 64, and at the other end are secured in a support frame 95 which is also bolted to the machine frame 64. The upper surface 96 of the support frame 95 constitutes a continuation of the rails 93.

The web W is fed through the main operating station O by two feeding mechanisms which operate independently of each other. One of these feeding mechanisms comprises a pair of main feed rolls 98, 99, and the other comprises a pair of clamps 100.

The clamps 100 are formed with gripping ridges 101 and are carried by an oscillating arm 102 (see FIGS. 4 and 17) which at its lower end is formed with a hub 104 which is pivotally mounted for oscillation around a bearing 106 which forms a part of the main machine frame 64. The bearing 106 also comprises the main bearing for the main drive shaft 62.

The oscillating arm 102 carries on it a cam roller 108 which operates in a cam groove 110 of a large cam 112 which is mounted on a cross-shaft 116 which is suitably journaled in the machine frame 64 and is driven from the main drive shaft 62 by a pair of meshing spur gears 118, 119 (see FIG. 17). Thus, during each rotation of the cam 112, the oscillating arm 102 is actuated through a full forward and a full return stroke.

During the forward stroke of this oscillating arm 102, the clamps 100 are moved downwardly to clamp the paper against a shoe 120 which is carried at the upper end of the oscillating arm 102 and is formed with a curved upper surface 121 which is aligned with the upper surfaces of the arcuate rails 93. The shoe 120 is formed with a pair of spaced grooves 122 which receive the rails 93. As a result of this clamping action, the web W is carried forward by the oscillating arm 102 during its forward stroke so that there is no relative movement between the web W and the arm 102 during this time.

The downward movement of the clamps 100 is effected by a cam roller 123 which operates in a cam groove 124 which is formed in the face of a large cam 126 which is keyed to and rotates with the main drive shaft 62. The cam roller 123 is carried on a pin 128 which is carried in a block 130 which is carried at the outer end of a pivot arm 132 which is secured to the oscillating arm 102 (see FIG. 9). The block 130 in turn is mounted in a U-shaped holder 134 which is carried at the bottom of a rod 136 which is carried in bearings 138 formed integral with the oscillating arm 102. At its upper end, the rod 136 carries an open clamp frame 140, the inwardly turned upper ends of which comprise the clamps 100 (see FIG. 9). The inner end of the clamp frame 140 is formed with a barrel 142 which fits around the rod 136 in sliding engagement therewith.

The clamp frame 140 is normally held against a stop collar 144, which is carried on the rod 136, by a spring 146 which operates between the bottom of the barrel 142 and an upper collar 148 which is also carried by the rod 136. The cam groove 124 is preferably shaped so that the cam 122 overtravels somewhat during its downward stroke to thereby put the clamps 100 under a spring pressure which is created by a compression of the spring 146.

As the web W is advanced through the main operating station O, a substantially endless supply string S which is carried on a supply spool 150 which is mounted on the machine frame 64 is guided into proximity to one side of the groove G on the upper surface of the web W. The supply string S, after leaving the spool 150, passes through a plurality of fixed guides 152 and a disc type tension clamp 154 and then through a looper arm 156 and a threader arm 158.

As the oscillating arm 102 begins its forward stroke, a short longitudinal slit 160 is cut through the web W in the groove G by a rotary knife 162 which is carried by a shaft 164 which is mounted in a stationary bearing 166 formed in the machine frame 64 (see FIG. 7). The shaft 164 is driven from the gear 76 of shaft 72 in time with the oscillating arm 102 through an idler gear 165, a spur gear 166, a cross-shaft 167, a sprocket 168, a chain 169, and a sprocket 170 (see FIGS. 1, 3 and 19).

As soon as the slit 160 has been made by the rotary knife 162, a needle 180 having an open hook 182 is projected upwardly through the slit 160 so that its open hook 182 is positioned above the upper surface of the web W and faces the supply string S. The needle 180 operates through a slot 183 formed in the shoe 120, and is carried in a holder 184 which comprises the enlarged head of a sliding rod 185 and which also carries a pointed punch 186 which passes through an opening 187 formed in the shoe 120 to punch a hole H in the web W in a predetermined position relative to the slit 160. The hole H is subsequently utilized to index the pull strings P with the preprinted labels in the wound tube as described in my earlier application Serial No. 19,872, filed on April 4, 1960.

The holder 184 is mounted in a stationary slide bearing 188 (see FIGS. 4, 10 and 18) formed in the oscillating arm 102. The lower end of the rod 185 is slidably mounted in a bearing 190 which is also formed in the oscillating arm 102. Intermediate its ends, the rod 185 has secured to it a collar 192 which carries a pivot pin 194. A connecting link 196 depends from the pivot pin 194, the bottom end of the connecting link 196 being secured to the free end of a pivoted arm 198, the other end of which is mounted on a pivot pin 200 which is fixed in the oscillating arm 102 (see FIG. 4).

The pivoted arm 198 carries, approximately midway between its ends, a cam roller 202 which operates in a cam race 204 which is formed in the large cam 126 radially inwardly of the first cam groove 124 and controls the movement of the holder 184.

After the holder 184 is moved to the top of its stroke and the needle 180 and the punch 186 projected through the web W, the supply string S is moved laterally of the web W by the threader arm 158 to bring it beneath the needle hook 182 and in effect to thread it into the needle 180. As best seen in FIG. 6, the threader arm 158 is curved and is pivotally mounted on a pin 210 which is carried by a web 212 which forms a portion of an upper frame 214 which is fixedly carried by the main machine frame 64. The supply string S passes through a hole 216 which is formed at the operative end of the threader arm 158, while the opposite end of the threader arm 158 is connected to a cross-link 218 which at its other end is carried by the pin 220 of a cam roller 222. The pin 220 in turn is secured to the bottom of a short vertical link 224 which is carried by a pivot pin 226 secured in place in the web 212.

The cam roller 222 operates in a cam groove 228 of a cam 230 (see FIG. 7) which is secured to and rotated by the shaft 164. Thus the transverse movement of the oscillating arm 102 is timed to the rotation of the slitting knife 162.

After the supply string S has thus been threaded into the needle 180 by the threader arm 153, the needle 180 is pulled downwardly by the cam race 204 so that it is withdrawn through the slit 160, thereby pulling a portion of the supply string S through the slit and forming it into a vertical stitch loop L which extends from the bottom surface of the web W.

Because of the tension exerted on the supply string S by the needle 180 as it pulls downwardly upon it, the opposite legs of the stitch loop L move to the ends of the longitudinal slit 160, become anchored or wedged therein with reasonable firmness, and separate from each other so that the loop L assumes a substantially V-shape. As soon as the loop L has been fully formed, the forward motion of the oscillating arm 102 carries it beneath a pressure roller 240 which is provided with a raised bead 242 which extends into the web groove G and pinches the supply string S against the web W which is backed up by the upper surface of the shoe 120. The roller 240 is mounted on a short shaft 244 which is carried on a pivoted bracket 246 which is pivotally mounted on the web 212 of the upper frame 214, and is pressed downwardly against the web W by a spring 250 which operates against the upper end of the pivot arm 246 (as best seen in FIG. 4). As a result of this pressure, the roller 240 is constantly driven by the web W as it is fed through the main operating station O, and functions to pull the supply string S from the supply spool 150. The shoe 120 is formed with two forwardly extending prongs 251 so that a portion of the shoe is disposed at all times beneath the roller 240 to prevent the web W from being depressed by the roller 240.

In order to maintain the supply string S in the groove G, a presser member 252 is provided which is split for a major portion of its length so that it straddles the groove G and does not interfere with the operation of the needle 180. One end of the presser member 252 is pivotally mounted on a pin 254 which is carried by one of the fixed string guides 152. At its other end, the presser member 252 carries a presser plate 256 which bridges the groove G and forms a barrier which guides the supply string S into the groove G. The plate 256 is pressed downwardly against the surface of the web W by a spring 258.

In order to minimize the tension which is exerted on the supply string S by the rather abrupt formation of the stitch loop L as the needle 180 is moved through the loop forming stroke which is indicated by the dot and dash line 259 shown in FIG. 26, the looper arm 156 is moved transversely of the web W prior to the formation of the stitch loop L to form a horizontal slack loop SL in the supply string as best seen in FIG. 31. The looper arm 156 is then moved through a return stroke back to its original position during the formation of the stitch loop L in synchronism with the downward movement of the needle 180 to thereby permit a controlled collapse of the slack loop SL during the formation of the stitch loop L. As a result, the string which is pulled through the slit 160 and formed into the stitch loop L is obtained from the slack loop SL and is not pulled from the spool 150 by the needle 180.

While it is obvious that the string which is required to form the slack loop SL is pulled from the spool 150 by the looper arm 156, the movement of the looper arm 156 is much less abrupt than the movement of the needle 180, since there is more time available for the formation of the slack loop SL than for the stitch loop L. Thus the possibilities of breakage of the string S is considerably reduced.

The looper arm 156 is actuated by a cam 260 which is carried by the shaft 164 adjacent the threader arm cam 230 (see FIG. 7). The cam 260 is formed with a cam groove 262 in which a cam roller 264, which is mounted intermediate the ends of a pivotal arm 266 (see FIG. 5) operates. The arm 266 is provided at one end with a pivot bearing 267 (see FIG. 5) which is mounted on a pivot pin 268 carried by the upper frame 214. As the cam roller 264 traverses the cam groove 262, it effects an oscillating of the arm 266 which is transmitted to the looper arm 156 by means of an adjustable link 269 which connects the arm 266 to the upper end of the looper arm 156, the looper arm 156 being pivotally mounted intermediate its ends on a pivot pin 270 which is secured in a block 272 which is secured in the upper frame 214.

After the stitch loop L has been fully formed, its rearward leg is severed at a point spaced below the under surface of the web W by a transversely moving cut-off knife 280 (see FIGS. 13–16) which is mounted in a slideway 282 formed in the bottom of the shoe 120. At its outer end, the knife 280 carries a cam roller 284 which operates in the cam groove 286 of a stationary cam 288 which is bolted to the adjacent end of the support frame 95 (see FIG. 4). A leaf spring 290 is positioned in a recess 292 formed in the bottom of the slideway 282 and functions to maintain the knife 280 in pressured engagement against the bottom of the shoe 120. The cutting edge 294 of the knife 280 is disposed in lateral alignment with the rear leg only of the stitch loop L. Thus, when the cut-off knife 280 is moved transversely by the cam 288 as the oscillating arm nears the end of its forward stroke, this rear loop leg is caught between the bottom edge of the shoe slot 183 and the cutting edge 294 of the knife 280 and is cleanly severed, thus dividing the loop L into a long segment F and a short segment J (see FIG. 18), both of which are anchored in the corners of the slit 160.

This string cutting action is effective to separate an individual pull string P from the supply string S, the pull string P comprising a portion M, which extends backwardly along the web from the previously cut slit 160, and the long segment F of the stitch loop L which has just been severed as described. It is this segment F, which extends from the bottom surface of the web W, which will comprise the exposed string end in the completed container body to provide the means whereby the portion M can be pulled to tear open the container body.

Shortly after this cutting action takes place, the arm 102 reaches the end of its forward stroke, and begins to slide backwardly beneath the web W on its return stroke. Just prior to the time this return stroke begins, the cam roller 123 moves the clamps 100 upwardly to release the web W and permit the main feed rolls 98, 99 to take over and continue the advancement of the web W through the machine without interruption.

The main feed rolls 98, 99 are driven from the shaft 72 in time with the oscillating arm 102 so that they make one complete revolution each time the oscillating arm 102 is driven through a complete oscillation i.e. through a full forward stroke and a full return stroke.

The lower feed roll 99 is secured to a shaft 300 which is journalled in a pair of fixed bearings 302, 304 which are secured to the main frame 64 (see FIG. 19). The upper feed roll 98 is mounted on a shaft 306 which is journalled in a pair of spaced bearings 308, 310 which are formed at the ends of a U-shaped yoke 312 which is pivotally mounted in a bearing 314 which is formed in an arm 316 secured to the main frame 64 (see FIGS. 1, 2, 19).

The rotation of the shaft 72 is transmitted to the shaft 300 through a bevel gear 316 which is secured to the end of the shaft 72, an intermediate bevel gear 318, and a bevel gear 320 which is secured to the end of the shaft 300. The rotation of the shaft 300 is in turn transmitted to the upper shaft 306 by a pair of meshing spur gears 322, 323 in such manner that the shaft 306 rotates in a direction opposite to the direction of rotation of the shaft 300.

During the time the clamps 100 clamp the web W against the shoe 120, the main feed rolls 98, 99 are cammed apart by a cam 324 (see FIGS. 4, 18, 19 and 26) which is carried by the lower feed roll 99 and engages against a bearing ring 326 carried by the upper feed roll 98. Thus, during the major portion of the forward stroke of the oscillating arm 102, the main feed rolls 98, 99 are cammed apart and are not operative. However, as the clamps 100 are released near the end of the forward stroke of the oscillating arm 102, the high point of the cam 324 rides off the bearing roll 326 and permits the upper feed roll 98 to move toward the lower feed roll 99 under the pressure exerted by a compression spring 328 which is mounted in a spring barrel 320 and presses downwardly against the yoke 312. As a result, the main feed rolls 98, 99 close upon the web W and take over its advancement during the return stroke of the oscillating arm 102.

As has been stated, it is frequently necessary to adjust the position of the loops L in the web W so that the pull strings P are so located in the wound tube that they will be properly positioned in the container bodies which are subsequently cut from the tube. Since the strokes of the oscillating arm 102 and the associated loop forming and cutting mechanisms are substantially non-adjustable, the necessary adjustments of the positions of the loops L in the web W are made by adjusting the lengths of web W which are fed between successive operations of these mechanisms. These adjustments are made, during the back stroke of the oscillating arm 102, by adjusting the effective feeding strokes of the main feed rolls 98, 99, as will now be described.

To effect this adjustment, a surge unit which is generally designated by the letter U is utilized. The surge unit U comprises a rocker housing 334 which is provided with bearings 336, 338 which are freely and pivotally mounted on the shafts 72 and 300, respectively. At its bottom end, the rocker housing 334 carries a plate 340 which forms a bearing for a short shaft 342 on which the intermediate bevel gear 318 is mounted.

As best seen in FIG. 19, because of the pivotal movement of the rocker housing 334, the intermediate bevel gear 318 becomes in effect a differential gear which is interposed between the bevel gears 316 and 320. Thus, when the rocker housing 334 is swung in a forward direction, i.e. to the right as seen in FIGS. 20 and 23, the bodily movement of the intermediate gear 318 relative to the fixedly mounted gears 316, 320 results in a surging acceleration of the gear 320 relative to the gear 318 and a consequent acceleration of the forward speed of the web W during the time the gear 318 is thus moved. On the other hand, when the gear 318 is moved backwardly, to the left (as seen in FIGS. 20 and 23), the gear 320 is decelerated and runs more slowly than the gear 316.

To effect this rocking movement of the bevel gear 318, a cam 344 is mounted on the shaft 167 so that it makes one revolution for each revolution of the main feed rolls 98, 99. The cam 344 is mounted in alignment with a cam roller 346 which is mounted on a short shaft 348 which is carried at the end of an upwardly extending arm 350 which is carried by the rocker housing 334. At its lower end, the rocker housing 334 carries a depending lug 352 which on one side carries a cylindrical stop pin 354.

On the other side of the lug 352, there is positioned a spring plunger 356 which is slidably mounted in one end of a bearing 358 secured in the main frame 64 and which is maintained in constant pressured engagement against the depending lug 352 by a spring 360 which operates between the end wall of the plunger 356 and the end wall of an adjustable cap 362 which is threadedly secured to the opposite end of the bearing 358.

As a result, the rocker housing 334 is constantly urged to the left by the plunger 356 to bring the stop pin 354 into engagement with a stepped cam 364 formed at the upper end of an arm 366 which, at its bottom, is split and clamped onto one end of a short shaft 368 by a bolt 367. The cam 364 is formed with three steps 380, 382 and 384, the center step 382 being normally aligned with the pin 354 and thus engaged by the pin 354 when the rocker housing 334 is swung backwardly by the plunger 356. The cam 364 limits the clockwise movement of the rocker housing 344, and thus maintains the cam roller 346 out of contact with the low portion of the rotating cam 344. The operating edge of the cam 344 is shaped so that there is no contact between the cam 344 and the roller 346 during the forward stroke of the oscillating arm 102.

However, during the return stroke of the oscillating arm 102, after the feed rollers 98 and 99 have taken over the advancement of the web W, the high portion of the cam 344 engages the cam roller 346 and causes the rocker housing 344 to rock in a counterclockwise direction, as viewed in FIGS. 20 and 23, against the pressure of the plunger 356. This swings the intermediate bevel gear 318 bodily around the bevel gears 316, 320 and the shaft 300 and consequently the main feed rolls 98, 99 are accelerated during the time that the bevel gear 318 is thus bodily moved. As a result, the speed of the advancing web W is correspondingly accelerated during this interval and a fixed increment is added over and above the length of web which would be advanced by the rotation of the feed rolls 98, 99 were there no surging action. It will be understood hat this surging action does occur during each feed stroke of the feed rolls 98, 99, and that it affords the means by which adjustments can be made in the length of the web W fed between each loop forming operation. To make possible a fixed adjustment of the normal distance between successive loops, an adjustment screw 386 is provided to adjust the position of the cam 364 and thereby limit the length of the return stroke of the rocker housing 334.

In order to offset this surging action so that the feed rolls 98, 99 are maintained in synchronism with the oscillating arm 102, the cam 344 is shaped so that its high portion rides off the cam roller 346 as soon as the cam 324 separates the feed rolls 98, 99. This permits the spring plunger 356 to swing the housing 334 backwardly to bring the stop pin 354 back into engagement with the cam 364. This return movement of the housing 334 moves the intermediate lug 318 bodily backwardly around the bevel gears 316, 320 with the result that the shaft 300 and consequently the main feed rolls 98, 99 are decelerated to offset the preceding acceleration. However, since this deceleration occurs while the feed rolls 98, 99 are separated by the cam 324, it has no effect on the advancement of the web W which at this time is being advanced by the oscillating arm 102.

As has been stated, an index hole H is formed in the web by the pointed punch 186 during each loop forming operation. Since the punch 186 is carried by the needle holder 184, the index holes H are positioned in a fixed predetermined relationship to the loops L. As described in my co-pending application Serial No. 19,872, filed April 4, 1960, these index holes H are utilized to determine whether a correction in the position of the pull strings P in the web W is required in order to maintain the pull strings P in the desired position in the wound tube.

If it is determined that the pull strings P are creeping ahead their desired position, an electrical impulse is introduced by suitable scanning devices (not shown) into a control circuit 400 which has incorporated in it a time delay relay 402. The relay 402, when actuated by the impulse, closes a pair of normally open contacts 404 in a second circuit 406 which has as one of its components a solenoid 408 which comprises an element of a solenoid operated double action air valve unit which is generally designated by the numeral 410 (see FIGS. 22 and 25). The circuit 406 also includes a movable contact arm 412 which is controlled by a cam 414 which is mounted on the shaft 164 so that its associated contacts 416 are open during the time the rocker housing 344 is rocking backwardly toward the cam 364 and are closed during a portion of the time the rocker housing 344 is being cammed away from the cam 364 by the rotary cam 344.

The timing of the impulse in the circuit 400 is fixed so that the contacts 404 are closed while the contacts 416 are also closed. When this occurs, the solenoid 408 is energized. This moves the solenoid armature 420 to the right, thus also moving a valve plunger 422 secured to the armature 420 to the right and permitting compressed air which is supplied by a supply pipe 423 to enter the upper end of the valve cylinder 424 and move the piston 426 and its piston rod 428 downwardly. The piston rod 428 has secured to its bottom a lug 430 which is formed with a slot 432 in which is disposed a pin 434 which is mounted in one end of a cross-yoke 436 which is clamped to the opposite end of the shaft 368 which carries the arm 366 at its other end.

As a result of the downward movement of the piston 426, the lug 430 is moved downwardly, first to bring the top of the slot 432 into contact with the pin 434 and thereafter to press downwardly on the pin 434 to rock the cross-yoke 436, and thus the shaft 368, until such time as a pin 438 which is carried on the opposite end of the cross-yoke 436 engages against the top of a slot 440 of a lug 442 which is carried at the bottom of a second air valve unit 444 which is mounted on the opposite side of the shaft 368 in parallelism with the first air valve unit 410. When the pin 438 contacts the top of the slot 440, the oscillation of the arm 366 ceases.

This rocking of the arm 366 moves the low step 380 of the cam 364 into alignment with the stop pin 354 of the rocker housing 334, the lateral movement of the cam 364 taking place during the time the rocker housing 334 is being rocked away from it by the cam 344 so that there is no interference between the cam 364 and stop pin 354.

When the high portion of the cam 344 now rides off the cam roller 346, thus permitting the spring plunger 356 to rock the rocker housing 334 through its return stroke, the stop pin 354 engages the low step 380 rather than the normal step 382. Thus, when the cam 344 rocks the rocker housing 334 through its next forward surging stroke, the arc of such stroke is longer than its normal arc and the increment which is added to the feed stroke of the feed rolls 98, 99 is increased in length. As a result, the length of web W fed during such stroke is longer than normal and the spacing between the loop L which is next formed in the web W and the preceding loop is lengthened, with the result that the relative position of the pull string P which includes the segment F of such next loop L is retarded.

During the initial portion of the next forward stroke of the rocker housing 334, the cam 364 is returned to its normal position, wherein the middle step 382 is aligned with the stop pin 354, by an upward movement of the piston 426 which is effected by the movement of the valve slide 422 to the left to vent the air from the top of the piston 426 and introduce compressed air into the cylinder 424 beneath the piston 426. This movement of the valve slide 422 is effected by a second solenoid 450 of the air valve unit 410 (see FIG. 25) which during this time is energized by the closing of a pair of normally open contacts 452 in its control circuit 454 by a contact arm 455 which is moved by a cam 456 carried by the shaft 164.

The high portions of the cams 414 and 456 are disposed relative to each other so that the contacts 452, 416 are successively closed each time the rocker housing 334 is being moved through one forward stroke, the contacts 452 being closed first to energize the solenoid 450 to thereby return the cam 364 to its normal position if it has been moved during the preceding cycle, and the contacts 416 thereafter being closed to energize the solenoid 408 and effect the next corrective adjustment, if such be called for by an impulse in the circuit 400. As a result, the solenoids 408, 450 are never simultaneously energized and a corrective adjustment may be made during each forward stroke of the rocker housing 334.

In a like manner, if it be determined that the pull strings P are falling behind their desired position in the subsequently wound tube, the second air valve unit 442 is utilized to rock the shaft 368 in the opposite direction to thereby move the high step 384 of the cam 364 into alignment with the stop pin 354 during a forward movement of the rocker housing 334. When this is done, the rocker housing 334 is moved through a shorter return stroke by the plunger 356. Thus, the next forward surging stroke of the rocker housing 334 is shorter than normal and a smaller increment is added to the feed stroke of the main feed rolls 98, 99 and a shorter length of web W is advanced during such stroke. As a result, the spacing between the loop L which is formed in the next loop forming operation and the loop which preceded it in web W is decreased and the pull string P which is thus formed is decreased in length and is thereby moved forwardly in the web W. After each such corrective adjustment, the unit 444 also operates to reset the cam 364 to its normal position.

It will be understood that the details of the air valve unit 444 and its associated circuits are not shown, since they are substantially identical in construction and operation with the air valve unit 410 and its circuits. It will suffice to say that the corrective adjustment made by the unit 444 is made only in response to an impulse in its control circuit, which corresponds to the control circuit 400 of the air valve unit 410, and that the air valve units 444, 410 are never actuated to make a corrective adjustment simultaneously, since only one corrective impulse is received during each cycle of the rocker housing 334.

From the foregoing it will be clear that each time the piston of the air valve unit 410 is caused to move downwardly, the length of web W which is fed during the next feeding stroke of the main feed rolls 98, 99 is increased, while each time the piston of the second air valve unit 444 is caused to move downwardly, the length of web W subsequently fed by the main feed rolls 98, 99 is decreased, and that after each such corrective operation the surge unit is reset so that a normal stroke will follow unless a new correction is called for during the ensuing stroke, in which event the necessary correction will again be made. Thus, there is made possible a constant running correction, with the result that the successive pull strings P are constantly maintained in the desired registry. Such constant adjustment may properly be called a vernier adjustment, since only a small increment is added or subtracted in each stroke of the machine.

There are times however when it is desirable to make a much larger adjustment in the length of web fed in each stroke of the main feed rolls 98, 99 in order to quickly bring the pull strings P into registry with the other components of the wound tube. This is particularly true when the machine is first being started up. In order to make this adjustment, which may be termed a gross adjustment, a second cam 460 having a much longer throw than the cam 344 is slidably secured to the shaft 167 by a pair of keys 461. The cam 460 is provided with a hub 462 which is formed with a groove 463, and is normally positioned so that it is out of registry with a second cam roller 464 which is carried on the shaft 348 of the rocker housing arm 350 (see FIGS. 19 and 20).

When it is desired to make the gross adjustment, the piston 465 of a third air valve unit 466 is actuated to slide the cam 460 laterally along the shaft 167 to bring it into alignment with the cam roller 464. The air valve unit 466 is similar in construction to the air valve units 410 and 444, but is set so that when it is not operative, its piston 465 is positioned at the far end of its cylinder 467, as seen in FIG. 21.

The air valve unit 466 is mounted on a bracket 468 secured to the machine frame 64 in parallelism with the shaft 167, and a sliding rod 470 is interposed between the air valve unit 466 and the shaft 167, the rod 470 being slidably mounted in bearings 472, 474 formed in the frame 64 and connected to the rod 476 of the piston 465 by a connecting link 478. The rod 470 has secured to it a connecting arm 480. The opposite end of the arm 480 is formed with a yoke 482 which engages within the groove 463 of the cam hub 462. Thus, when the piston 465 is actuated, the rod 470 is slid in the bearings 472, 474 until a stop collar 482 carried by it engages the adjacent bearing 474, at which point the cam 460 is in alignment with the cam roller 464.

The actuation of the air valve unit 466 is effected by merely pressing a control button (not shown) in the control circuit of the unit 466 to close a pair of contacts in the circuit. The control circuit is also provided with cam controlled contacts (not shown) similar to the contacts 416, which are in series with the contacts of the control button so that this sliding movement of the cam 460 takes place only during the time the low portion of the cam 460 is disposed in opposition to the cam roller 464 so that there is no interference between the cam 460 and cam roller 464. The circuit is preferably so designed that the cam 460 may be maintained in alignment with the cam roller 464 for one or more rotations of the shaft 167 so that the necessary number of gross adjustments can be successively made to quickly bring the pull strings P into the desired registry. Because of its much greater throw, the cam 460, when aligned with the cam roller 464 takes over control of the forward stroke of the rocker housing 334 from the cam 344, and actuates the rocker housing 334 through a much longer forward stroke than does the cam 344. As a result, a much greater increment is added to the length of web which is fed by the feed rolls 98, 99 while such adjustment is being made and thus the pull strings P are quickly brought into the desired registry. After this has been done, the actuating solenoid of the air valve unit 466 is deenergized and the return solenoid of the air valve unit 466 is energized to return the cam 460 to its normal inoperative position where it is out of alignment with the cam roller 462. From this point on, the pull strings P are maintained in registry by the operation of the surge unit U.

After the loop L has been formed and cut as previously described, the continued advancement of the web W through the machine pulls the string segment F smoothly out of the needle hook 182. Thereafter the web W passes between a pair of idler rolls 483, 484 which help keep it under control. The upper roll 483 is mounted in a pivoted, spring-backed mounting bracket 485 and is backed up by the lower pressure roll 484 which is mounted on a shaft 486 which is journalled in the support frame 95.

After passing between the rolls 483, 484 the web W moves along the upper surface 96 of the support frame 95 and beneath a nozzle 490 which is disposed in vertical alignment with the groove G and deposits a suitable adhesive composition 492 in the groove G to finally secure the pull strings P in place therein. The adhesive composition 492 preferably comprises a waxy thermoplastic composition such as a mixture of paraffin and microcrystalline wax.

After passing over the support frame 95, the web W passes between a pair of exit feed rolls 494, 496. The exit rolls 494, 496 are driven from the shaft 116 by a chain 498 which operates around a sprocket 500 keyed to the shaft 116 and around a sprocket 502 which is keyed to a shaft 504 which carries the lower exit roll 496. The upper exit roll 494 is mounted on a shaft 506 and is driven from the shaft 504 through a pair of meshing spur gears 508 (see FIG. 1). The shaft 506 is carried in a pivoted mounting yoke 510, and the upper roll 494 is pressed downwardly towards the lower roll 496 by a spring 512 which operates against the yoke 510.

The gearing of the exit roll drive is such that if the web W were not present, the controls would rotate at a surface speed which is slightly in excess of the normal speed of advancement of the web W. Thus, the web W is maintained under a constant mild pulling tension to prevent it from buckling as it passes through the machine. In order to prevent tearing of the web W due to this tension, a magnetic particle clutch 514 (see FIG. 1) is interposed in the shaft 504 of the lower exit roll 496. The magnetic particle clutch 514 is of the conventional type which permits limited slippage of the clutch parts relative to each other and thus permits the exit rolls 494, 496 to slow down and adjust themselves to the speed of the web W.

The upper exit roll 494 is provided with a groove 516 which is disposed in alignment with the groove G of the web W in order to prevent the feed roll 494 from coming into contact with and being fouled by the adhesive composition 492.

After passing between exit rolls 494, 496, the web W passes around an exit drum 518 and is discharged from the machine. An electrically heated presser foot 520 which is carried by a mounting rod 522 (see FIG. 1) and is maintained against the web W by a spring 524 is provided in order to reheat the thermoplastic adhesive 492 in the web groove G to cause it to reflow and smooth out as seen in FIG. 36.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:
1. A machine for forming pull strings in a web of material, comprising means for guiding said web along a path of travel, means for guiding a supply string into proximity to one side of said web, loop forming means for passing a portion of said supply string through said web and forming it into a loop extending from the opposite side of said web, carrying means for reciprocating said loop forming means through a forward stroke and a return stroke substantially along a portion of said path of the web, means for operating said loop forming means through a completed loop forming cycle during only said forward stroke of the carrying means, and means for securing said web during said forward stroke to said carrying means whereby said web is advanced at the same speed as said loop forming means during said loop forming cycle.

2. The machine of claim 1 wherein said web securing means operates to clamp said web to said carrying means during the operating cycle of said loop forming means.

3. The machine of claim 1 wherein said carrying means is an oscillating member.

4. The machine of claim 3 wherein said web securing means comprises a web clamping element carried by said oscillating member.

5. A machine for forming pull strings in a web of material, comprising means for guiding said web along a path of travel, means for guiding a supply string into proximity to one side of said web, loop forming means for pulling a portion of said supply string through said web to form it into a loop extending from the opposite side of said web, means for advancing said loop forming means through a forward operating stroke along said path of the web wherein said loop forming means is operative to form a loop on said web and through a return stroke wherein it is inoperative to form a loop, means for advancing said web along said path during said forward operating stroke at the same speed as said loop forming means, and a second means for advancing said web along said path during said return stroke, and means for varying the length of web advanced by said second advancing means during said return stroke to thereby vary the distance between successive loops in said web.

6. The machine of claim 5 wherein said last named means are automatically adjustable during the operating of said machine to effect a constant running adjustment of the position of successive loops in said web.

7. A machine for forming pull strings in a web of material, comprising means for guiding said web along a path of travel, means for guiding a supply string into proximity to one side of said web, an oscillating member mounted for oscillation on the other side of said web, means for oscillating said member through a forward stroke and through a return stroke, means for securing said web to said oscillating member during the forward stroke of said oscillating member whereby said oscillating member advances said web during its forward stroke only, a needle carried by said oscillating member, means for projecting said needle through said web and for withdrawing said needle from said web during only the forward stroke of said oscillating member to pull a portion of said supply string through said web and form it into a loop extending from said other side of said web, means for releasing said web from said oscillating member during its return stroke, a second means for advancing said web independently of said oscillating member during the return stroke of said oscillating member, and means for varying the length of web fed by said second advancing means during said return stroke to thereby vary the distance between successive loops in said web.

8. The machine of claim 7, wherein said web is clamped to said oscillating member during its forward stroke, and wherein the means for advancing the web during the return stroke of said oscillating member comprise a pair of feed rolls.

9. The machine of claim 8 wherein said feed rolls are driven in timed relationship to said oscillating member and are separated during the forward stroke of said oscillating member to render them inoperative to feed the web and are brought together during the return stroke of said oscillating member to render them operative to advance the web.

10. The machine of claim 9 wherein said means for varying the length of web fed during the return stroke of the oscillating member comprises a differential interposed in the drive of said feed rolls.

11. The machine of claim 10 wherein said differential is operative to accelerate said feed rolls during the return stroke of said oscillating member when they are operative to advance said web, and is operative to decelerate said feed rolls during the forward stroke of said oscillating member when said feed rolls are inoperative to advance said web.

12. The machine of claim 11 wherein means are provided to adjust said differential while said machine is operating to effect a running adjustment in the length of web fed by said feed rolls.

13. A machine for operating on a web of material, comprising a first web advancing means and a second web advancing means for advancing said web along a predetermined path of travel, said first and second web advancing means being alternately operable independently of each other, means movable with and at the same speed of advancement as said web for performing an operation on said web while said first web advancing means is advancing said web, and means for varying the speed of advancement of said web while said second web advancing means is advancing said web to alter the distance between the operations performed on said web.

14. The machine of claim 13 wherein said first web advancing means comprises an oscillating arm which clamps onto said web during its forward stroke to effect the advancement of said web.

15. The machine of claim 13 wherein said second web advancing means comprises at least one feed roll and wherein said means for varying the speed of advancement of said web comprises a differential for varying the speed of rotation of said feed roll.

16. The machine of claim 15 wherein said differential is effective to add an increment to the feed stroke of said feed roll each time said feed roll takes over the advancement of said web.

17. The machine of claim 16 wherein means are provided to vary the length of said increment.

18. The machine of claim 17 wherein said differential comprises a pair of fixedly mounted bevel gears and an intermediate bevel gear which is oscillatable bodily around said bevel gears, and wherein means are provided to vary the arc of oscillation of said intermediate bevel gear.

19. The machine of claim 18 wherein means are provided to exert a constant pulling tension on said web while it is being advanced by said first and second web advancing means.

20. A machine for forming individual pull strings in a web of material as said web is advanced along a predetermined path of travel, an oscillating arm mounted on one side of said path of the web, means carried by said oscillating arm for clamping onto said web during its forward stroke for advancing said web during the forward stroke of said oscillating arm and for releasing said web during the return stroke of said oscillating arm, a pair of feed rolls for advancing said web during the return stroke of said oscillating arm, means for timing the rotation of said feed rolls to the oscillation of said arm, means for moving said feed rolls apart and rendering them ineffective to advance said web during the forward stroke of said oscillating arm, means for guiding a supply string into proximity to the opposite side of said advancing web, a hooked needle carried by said oscillating arm, means for projecting said hooked needle through said web during the forward stroke of said oscillating arm, means for threading said supply string into said hooked needle, means for retracting said hooked needle from said web to pull a portion of said supply string through said web to form it into a loop, and means for severing the string in said loop to thereby create an individual pull string having a free end, said four last named means being operative during only the forward stroke of said oscillating arm, and differential means for varying the feeding movement of said feed rolls during the return stroke of said oscillating arm to vary the length of web fed between successive loop forming and cutting operations to adjust the distance between said loops of the individual pull strings in said web.

References Cited in the file of this patent

UNITED STATES PATENTS

| | | |
|---|---|---|
| 1,920,823 | West et al. | Aug. 1, 1933 |
| 1,940,312 | Lessler | Dec. 19, 1933 |
| 2,553,877 | Smith et al. | May 22, 1951 |
| 2,694,964 | Smith | Nov. 23, 1954 |
| 2,712,771 | Isom | July 12, 1955 |
| 2,721,612 | Almgren | Oct. 25, 1955 |
| 2,788,079 | Allison | Apr. 9, 1957 |
| 2,812,734 | Richards | Nov. 12, 1957 |